United States Patent
Loukus et al.

(10) Patent No.: US 10,514,075 B2
(45) Date of Patent: Dec. 24, 2019

(54) VARIABLE-DENSITY COMPOSITE ARTICLES, PREFORMS AND METHODS

(71) Applicant: REL, Inc., Calumet, MI (US)

(72) Inventors: Adam R. Loukus, Calumet, MI (US); Josh E. Loukus, Calumet, MI (US)

(73) Assignee: LOUKUS TECHNOLOGIES, INC., Calumet, MI (US)

( * ) Notice: Subject to any disclaimer, the term of this patent is extended or adjusted under 35 U.S.C. 154(b) by 0 days.

(21) Appl. No.: 15/398,430

(22) Filed: Jan. 4, 2017

(65) Prior Publication Data

US 2017/0184165 A1 Jun. 29, 2017

Related U.S. Application Data

(63) Continuation of application No. 14/218,969, filed on Mar. 18, 2014, now Pat. No. 9,550,341.

(Continued)

(51) Int. Cl.
*B32B 5/14* (2006.01)
*F16D 65/12* (2006.01)
(Continued)

(52) U.S. Cl.
CPC ........... *F16D 65/125* (2013.01); *B22D 19/02* (2013.01); *B22D 19/14* (2013.01); *B22F 3/22* (2013.01); *B29C 70/887* (2013.01); *B32B 5/14* (2013.01); *C22C 32/00* (2013.01); *C22C 47/12* (2013.01); *C22C 49/04* (2013.01); *C22C 49/06* (2013.01); *B22F 2999/00* (2013.01); *F16D 2200/0047* (2013.01); *F16D 2200/0065* (2013.01);
(Continued)

(58) Field of Classification Search
None
See application file for complete search history.

(56) References Cited

U.S. PATENT DOCUMENTS

| 5,002,836 A | 3/1991 | Dinwoodie et al. |
| 5,167,271 A | 12/1992 | Lange et al. |

(Continued)

FOREIGN PATENT DOCUMENTS

| JP | 2000317613 | 11/2000 |
| JP | 2009121509 | 6/2009 |

(Continued)

OTHER PUBLICATIONS

"Communication Pursuant to Rules 161(1) and 162 EPC," for European Patent Application No. 14729490.4, dated Dec. 4, 2015 (2 pages).

(Continued)

*Primary Examiner* — Seth Dumbris
(74) *Attorney, Agent, or Firm* — Device Patent LLC

(57) ABSTRACT

A metal matrix composite article that includes at least first and second regions, first and second reinforcement materials, a metal matrix composite material occupying the second region of the body and comprising a metal matrix material and the second reinforcement component, a preform positioned in the first region of the body and infiltrated by at least the metal matrix material of the metal matrix composite material. The article further includes a transition region located proximate an outer surface of the preform that includes a distribution of the second reinforcement component comprising a density increasing according to a second gradient in a direction toward the outer surface of the preform.

10 Claims, 11 Drawing Sheets

Related U.S. Application Data

(60) Provisional application No. 61/802,277, filed on Mar. 15, 2013.

(51) Int. Cl.
 *B29C 70/88* (2006.01)
 *B22D 19/02* (2006.01)
 *B22D 19/14* (2006.01)
 *C22C 47/12* (2006.01)
 *B22F 3/22* (2006.01)
 *C22C 32/00* (2006.01)
 *C22C 49/04* (2006.01)
 *C22C 49/06* (2006.01)

(52) U.S. Cl.
 CPC .............. *F16D 2200/0082* (2013.01); *Y10T 428/12458* (2015.01)

(56) References Cited

U.S. PATENT DOCUMENTS

| | | | |
|---|---|---|---|
| 5,433,511 A | 7/1995 | Wei et al. |
| 5,574,957 A | 11/1996 | Barnard et al. |
| 5,980,792 A | 11/1999 | Chamlee |
| 6,539,644 B1 | 4/2003 | Araya et al. |
| 7,793,703 B2 | 9/2010 | Wood et al. |
| 8,016,018 B2 | 9/2011 | Wood et al. |
| 8,075,827 B2 | 12/2011 | Loukus et al. |
| 8,153,541 B2 | 4/2012 | Wood et al. |
| 8,455,379 B2 | 6/2013 | Wood et al. |
| 8,550,145 B2 | 10/2013 | Wood et al. |
| 9,145,938 B2 | 9/2015 | Wood et al. |
| 9,550,341 B2 | 1/2017 | Loukus et al. |
| 2004/0035547 A1 | 2/2004 | Grether |
| 2005/0183909 A1 | 8/2005 | Rau et al. |
| 2009/0311541 A1 | 12/2009 | Wood et al. |
| 2012/0227624 A1 | 9/2012 | Loukus et al. |
| 2013/0087420 A1 | 4/2013 | Fraley et al. |
| 2013/0169901 A1 | 7/2013 | Kim et al. |
| 2014/0272451 A1 | 9/2014 | Loukus et al. |

FOREIGN PATENT DOCUMENTS

| | | |
|---|---|---|
| WO | 2007033378 | 3/2007 |
| WO | 2014149135 | 9/2014 |

OTHER PUBLICATIONS

International Preliminary Report on Patentability for PCT/US2014/000050 dated Sep. 24, 2015 (10 pages).
International Search Report and Written Opinion for PCT Application No. PCT/US2014/000050, dated Nov. 11, 2014 (14 pages).
Invitation to Pay Additional Fees and Partial Search Report for PCT/US2014/000050 dated Aug. 12, 2014 (5 pages).
"Non-Final Office Action," for U.S. Appl. No. 14/218,969 dated Dec. 24, 2015 (14 pages).
"Notice of Allowance," for U.S. Appl. No. 14/218,969 dated Sep. 15, 2016 (16 pages).
"Response to Communication Pursuant to Rules 161(1) and 162 EPC," for European Patent Application No. 14729490.4, filed with the EPO Jun. 6, 2016 (18 pages).
"Response to Non-Final Office Action," for U.S. Appl. No. 14/218,969 filed with the USPTO Jun. 24, 2016 (10 pages).

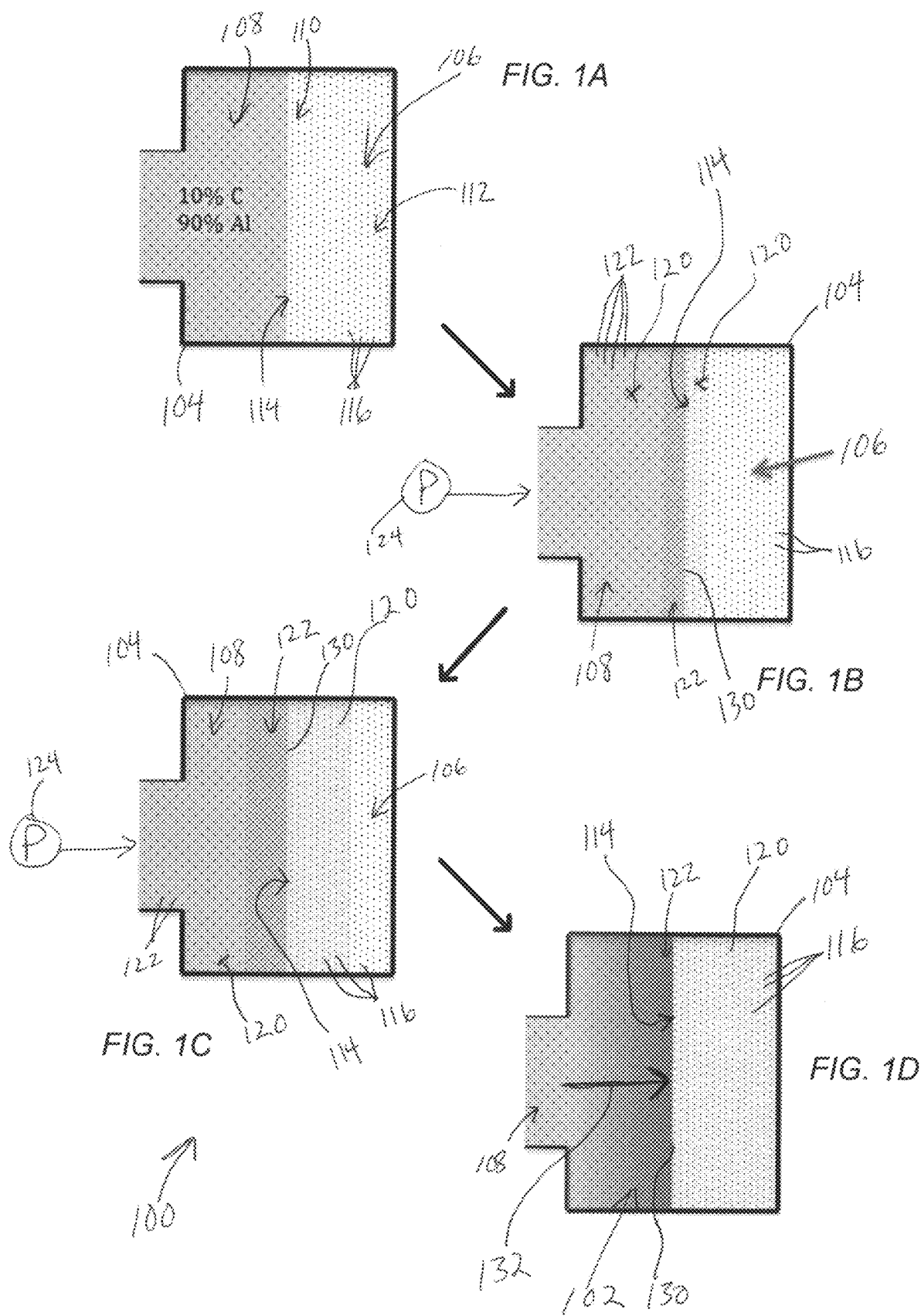

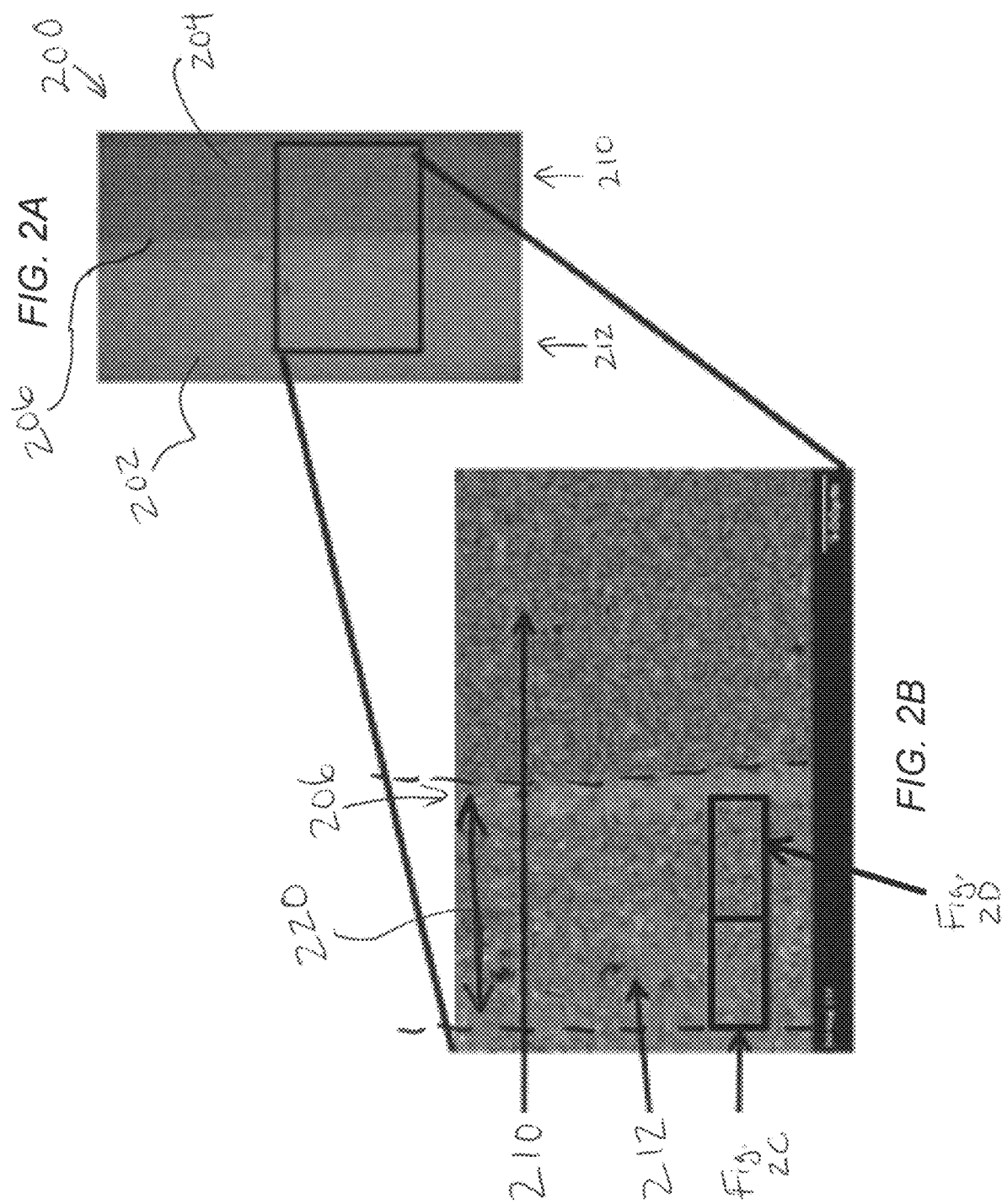

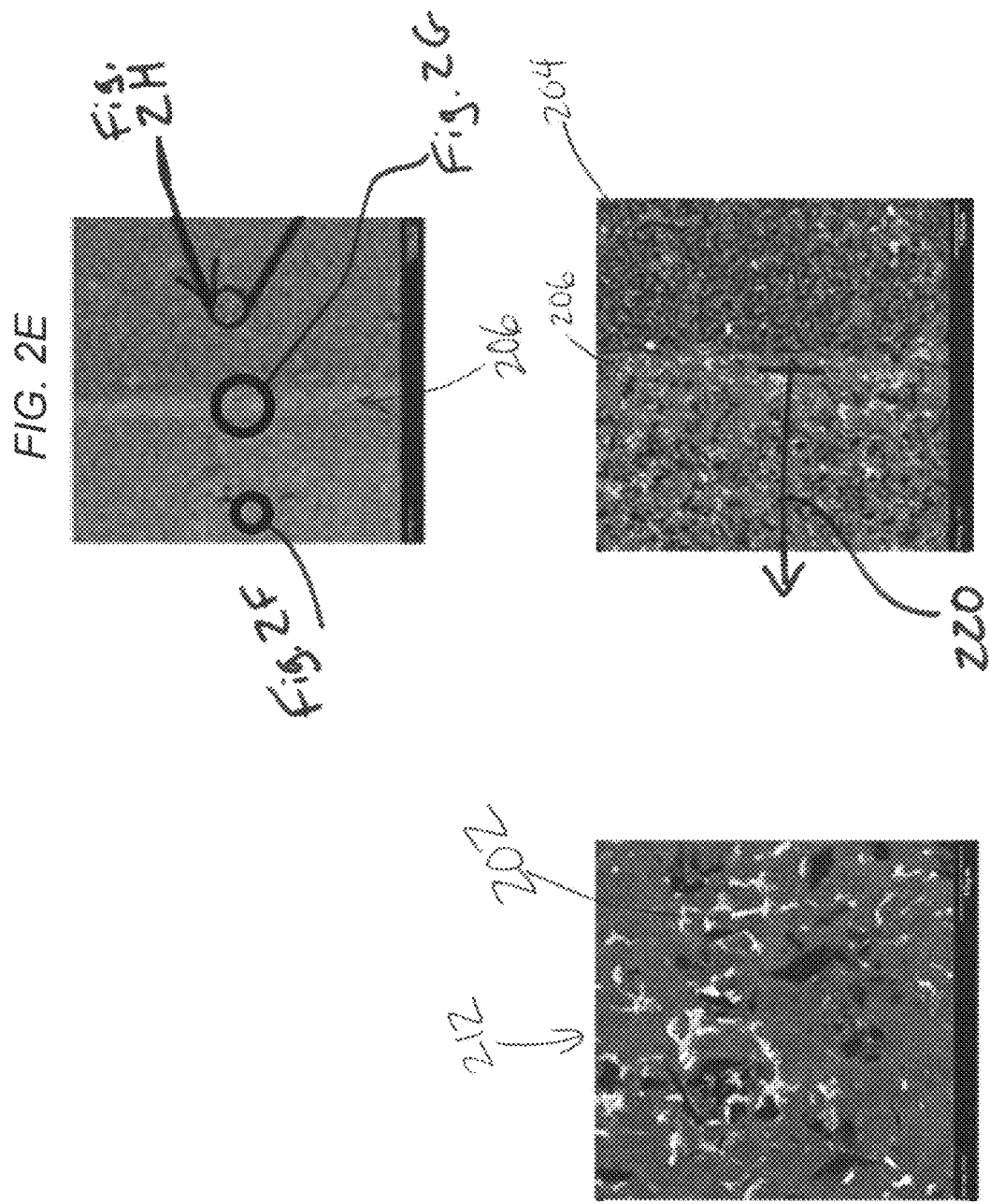

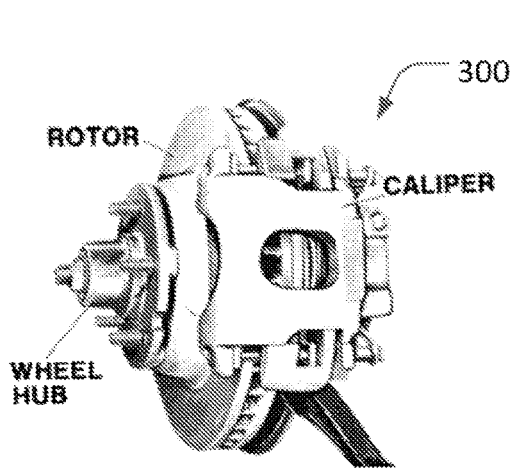
FIG. 3
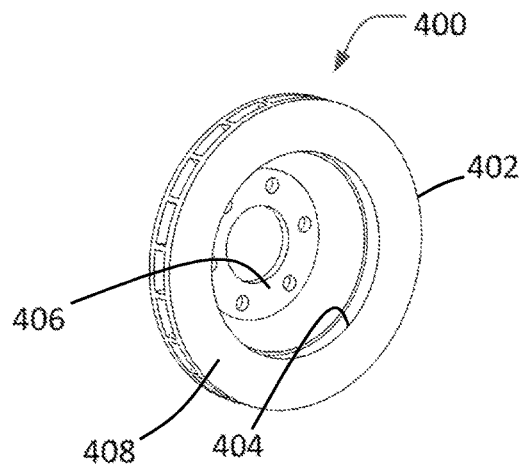
FIG. 4A
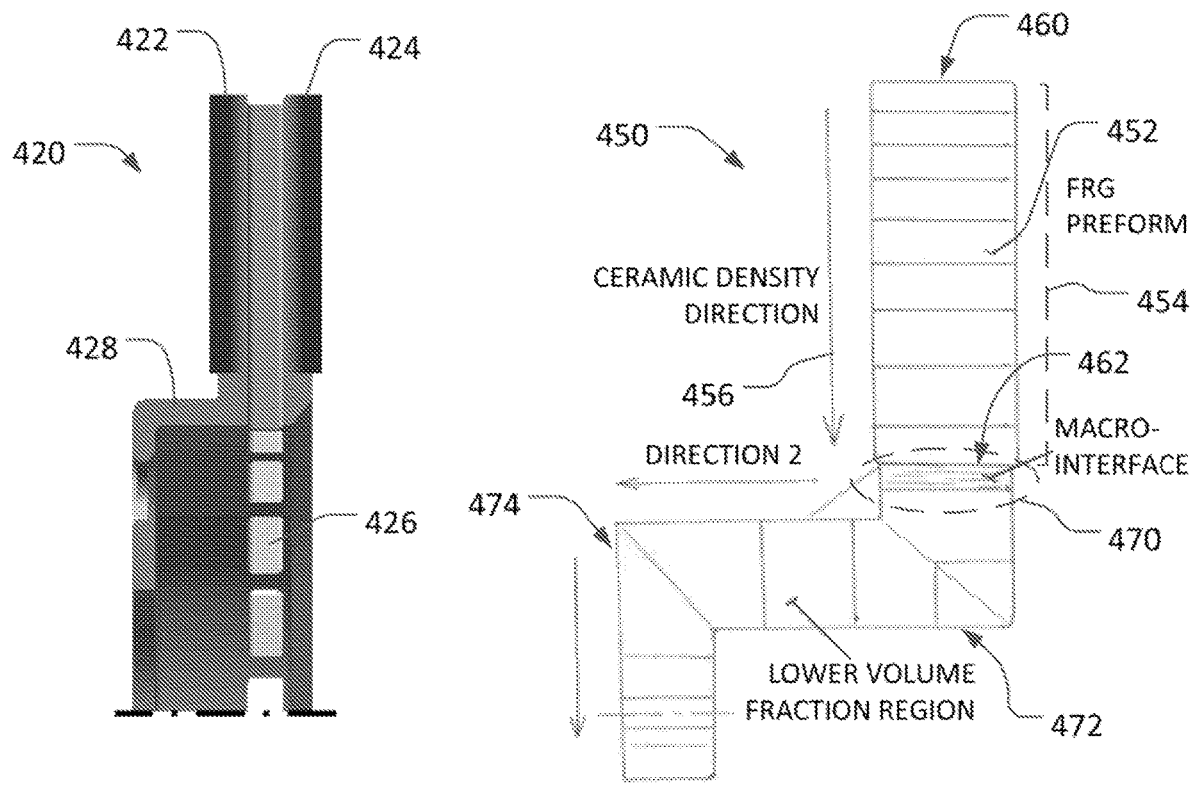
FIG. 4B
FIG. 4C

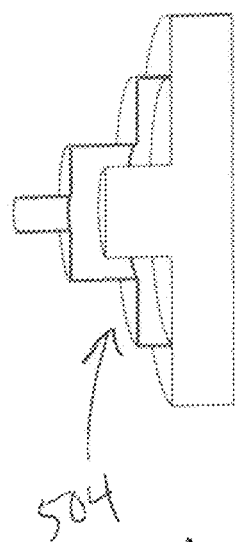
FIG. 5A
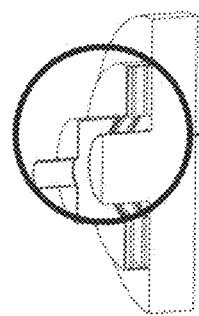
FIG. 5B
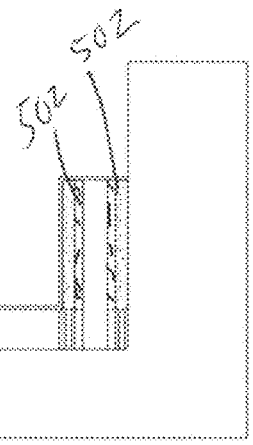
FIG. 5C
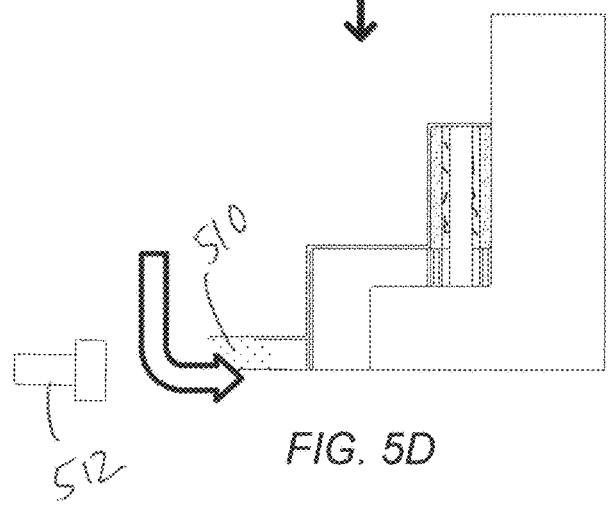
FIG. 5D

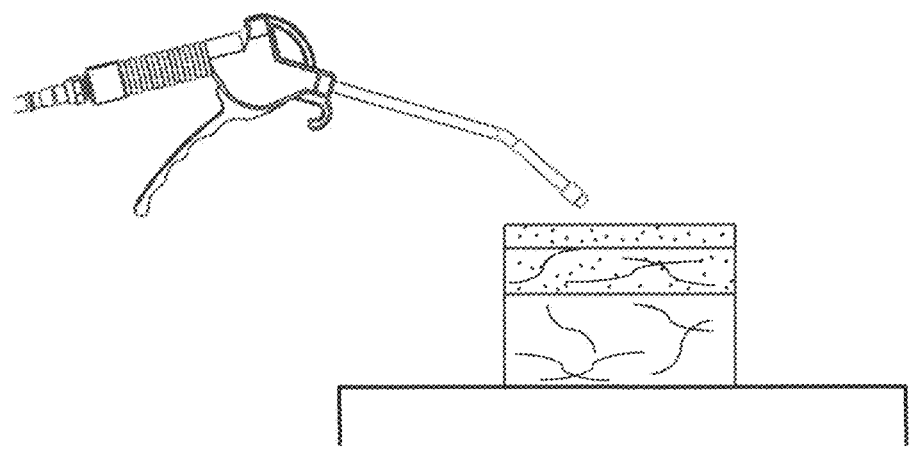
FIG. 10
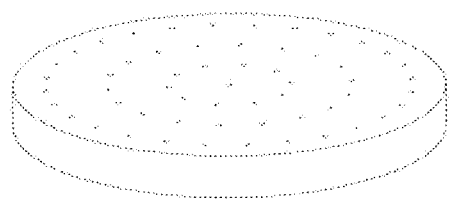 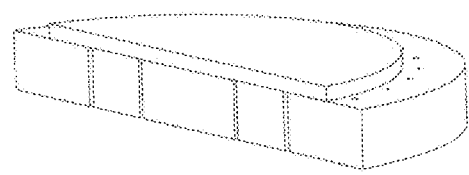
FIG. 11A    FIG. 11B
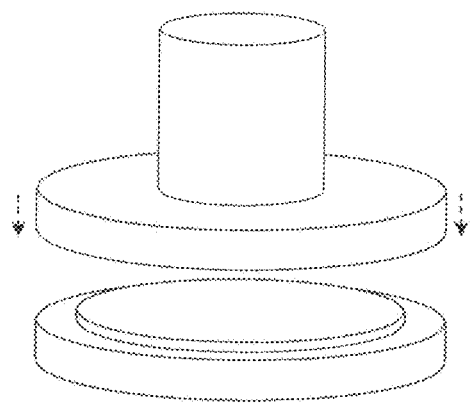
FIG. 12

VARIABLE-DENSITY COMPOSITE ARTICLES, PREFORMS AND METHODS

CROSS-REFERENCES

This application is a continuation of U.S. application Ser. No. 14/218,969, filed Mar. 18, 2014 and claims the benefit of U.S. Provisional Application No. 61/802,277, filed Mar. 15, 2013, the content each of which is hereby incorporated by reference in its entirety.

FIELD

This disclosure relates generally to composites and castings having varying degrees of reinforcement, and relates more particularly to casting preforms, cast articles containing such preforms infiltrated with a matrix material, and to methods for making the same.

BACKGROUND

Traditional materials (e.g., metals, plastics, ceramics, resins, concrete, etc.) do not always provide components with all the requisite properties sufficient for adequate performance under field service conditions. As is well known, one manner of modifying and/or enhancing the final properties of a component is to reinforce the primary material making up the component with one or more additional materials. One class of reinforced materials are matrix composites, which are generally formed from traditional materials (e.g., a matrix material) that include one or more discrete reinforcement constituents (e.g., a reinforcement material or component) distributed within a continuous phase of the matrix material. Such matrix composites exhibit functional and structural characteristics that depend upon, for example, the properties of the reinforcement constituent(s), the architectural shape and geometry of such constituent(s), and the properties of the interfaces between and among different constituents and the matrix material.

Composite materials typically include one or more different types of reinforcement materials. Particle reinforcement often includes non-metallic, and commonly ceramic, particles (e.g., SiC, $Al_2O_3$, etc.), but may include a variety of particles and materials that provide advantages or reinforcement for one or more properties of the matrix composite. Reinforcement of matrix material with fibers, including continuous-fibers, monofilament, and/or short-fibers is also known in the art. Generally, different types of matrix composites require or are typically associated with different primary processing routes/methods. Examples of different processes for forming matrix composites include, though are not limited to, in-situ reactive processes, diffusion bonding, blending and consolidation, vapor deposition and consolidation, liquid-state processing, stir casting/slurry casting, centrifugal casting, and infiltration processes involving infiltration of matrix material into porous preforms.

Some existing manufacturing and forming processes are designed to provide distributions of a reinforcement material within a matrix material. In some cases the reinforcement material may be distributed uniformly throughout an area, while in other cases the distribution may be non-uniform. In many cases, though, limitations with past techniques have led to less than desirable outcomes, resulting in a continuing search for forming processes, and corresponding composite materials, that exhibit desired structural and/or functional properties.

A brief overview of some processes that have been used to form composite materials will now be provided. In situ selective reinforcement methods involve placing and positioning a pre-cast reinforcement material member (sometimes referred to as a 'preform') into a near net-shape casting mold. Matrix material is then cast around the reinforcement member to form the composite. While the amount and/or density of pre-cast reinforcement material can be varied as desired, the constituent material of the reinforcement members does not become integrated (e.g., mixed or infiltrated) with the matrix material, except perhaps in a limited extent at the interfacial boundaries between the reinforcement member and the unreinforced matrix material. Therefore, such in situ methods are hindered by abrupt and problematic differential coefficients of thermal expansion ('CTE') between the matrix material and reinforcement member. Such abrupt transitions in CTE at the matrix-reinforcement interface boundaries can give rise to residual stress during the forming process (e.g., residual stress-concentration), and also manifest in stress fractures during thermal cycling of the reinforced components during service.

Another example of in situ selective reinforcement involves infiltration casting of matrix material into porous preforms positioned in near net-shape casting molds. The structure of the porous preform includes a reinforcement constituent, which may be uniform or non-uniform. One advantage of preform infiltration casting is that the method is relatively fast, thus resulting in a more integrated, infiltrated preform with substantially more contact area between the reinforcement and matrix materials. Even so, the materials still exhibit abrupt transitions in CTE at the interface/boundaries between the preform and the unreinforced matrix material that can create the stress problems noted above. Additionally, there are practical limits to the amount and density of reinforcement material that can be placed within a porous preform, because resistance to infiltration casting substantially increases at high reinforcement levels (e.g., beyond 15% to 20% material in the preform). In addition, the thickness and cross-sectional area of such preforms must be limited to allow complete infiltration prior to cooling of the matrix material.

Centrifugal casting techniques have been used to selectively reinforce composite materials by favorably placing or distributing reinforcement material to form gradient or layered distributions of the reinforcement material within the matrix material. While abrupt transitions in the coefficient of thermal expansion ('CTE') at the matrix-reinforcement interface boundaries can be reduced in centrifugal embodiments where continuous particle gradients are formed within the matrix material, such methods still suffer from differential CTE effects in cost-effective embodiments comprising layered reinforcement particles. Additionally, in centrifugal methods, the attainable variations of particle distributions are limited to bands or layers and/or continuous gradients, and if different reinforcement particle types having differing densities are simultaneously used, it may be impossible to get adequate coordinate (co-localized) particle gradient distributions for the divergent particle types, or to get the different particle types where they are needed, and in the desired pattern.

In further examples, another type of selective reinforcement involves the deposition or spraying (e.g., by low or high velocity spray techniques) of reinforcement particles onto the surface of near net-shape matrix material castings. One drawback of such methods for these applications is that the spray or deposition is superficial, because it is applied to the surface of solid matrix material castings, and does not substantially penetrate beyond the surface. Additionally, such superficial reinforcement coatings must generally be significantly machined prior to placing the reinforced casting into service. Moreover, absent resurfacing with more reinforcement, the effective service life of such castings is over once the superficial reinforcement layer is worn and/or otherwise degraded. Furthermore, in such superficial reinforcement applications, bonding and integration of the sprayed/deposited reinforcement with the matrix material is limited, even with the most optimal spray/deposition methods.

Gelcasting methods are another way to make functional gradient materials having preforms. In gelcasting, gradient reinforced preforms can be formed using gravitational or centrifugal forces to achieve a vertical composition gradient in molded slurries. The preforms may then be subsequently infiltrated. As with centrifugal casting embodiments, the attainable variations of particle distributions for preform gelcasting methods are limited to layers and/or continuous gradients. If different reinforcement particle types having differing densities are simultaneously desired/used, it may be impossible to get adequate coordinate (co-localized) particle gradient distributions for the divergent particle types, or to get the different particle types where they are needed, and in the desired pattern. Additionally, preforms made by such gelcasting methods are problematic because of excessive warpage and anisotropic shrinkage occurring during the sintering stage because of different sintering kinetics for the material components.

Accordingly, methods and processes exist to form composite materials, as well as composite materials having varying material densities such as reinforcement material gradients and other distributions, both non-uniform and uniform. As discussed above, though, limitations with past techniques have led to a continuing search for improved processes for forming composite materials, and corresponding composite materials and articles, exhibiting improved and/or desired structural and/or functional properties.

SUMMARY

Some embodiments of the invention provide, among other things, advances in the structure and/or the formation of composite materials. Some disclosed composite materials and forming methods provide, for example, improvements in structural and/or functional properties of the composite materials. Some embodiments of the invention are related to techniques for reinforcing composite materials, including the formation and use of casting preforms. In some cases, reinforcing structures, including functional reinforcement gradients, are formed in conjunction with one or more interfaces existing between different materials within a composite material. As one example, a preform can form part of the material interface and a functional reinforcement gradient can be formed through infiltration of the preform. Some embodiments provide novel material spray and/or deposition methods for making casting preforms, which can also provide an ability to form a functional reinforcement gradient within the preform. In some cases a preform spray and/or deposition material may include one or more reinforcement components, including reinforcement particles and/or fibers. According to some embodiments, methods of controlling material density are provided that include, for example, blending relative amounts of reinforcement particles and reinforcement fibers.

One embodiment of the invention includes a metal matrix composite ('MMC') article that includes a reinforced cast body. The body has a first region and a second region with the first region having more reinforcement than the second region. The article also includes a metal matrix composite material occupying the second region of the body and a preform positioned in the first region of the body. The metal matrix composite material includes a metal matrix material and a second reinforcement component, and the preform is infiltrated by at least the metal matrix material. The preform further includes a first end, a second end, an outer surface, a first reinforcement component, and a porous structure that is configured to allow passage of the metal matrix material into the preform. The preform/porous structure is also configured to block or reduce passage of the second reinforcement component into the preform. The first reinforcement component within the preform comprises a density increasing between the first end of the preform and the second end of the preform according to a first gradient. The MMC article also includes a transition region of the body that is located proximate the outer surface of the preform. The transition region extends between the first and second region and includes a distribution of the second reinforcement component adjacent to the outer surface of the preform. The distribution of the second reinforcement component has a density that increases according to a second gradient in a direction toward the outer surface of the preform.

Some embodiments of the invention described herein provide a method for making a metal matrix composite article. For example, performing the steps of one method can provide the MMC article discussed directly above. In some cases, a method for making a MMC article includes providing a porous preform, positioning the preform within a die cavity, introducing a molten metal matrix composite material into the die cavity about the preform, pressurizing the molten metal matrix composite material, thereby infiltrating the preform with at least a liquid component, and forming a distribution of a second reinforcement component adjacent to the outer surface of the preform.

According to the method for making the MMC article, the porous preform includes a first end, a second end, an outer surface, and a first reinforcement component. The first reinforcement component has a density that increases between the first end of the preform and the second end of the preform according to a first gradient. According to the disclosed embodiments, the second reinforcement component is part of the metal matrix composite material, which also includes a liquid component that infiltrates into the preform. In some cases the distribution of the second reinforcement component, adjacent to the outer surface of the preform, has a density that increases in a direction toward the outer surface of the preform according to a second gradient. Accordingly, in some examples the first reinforcement component has a density that increases within the preform according to a first gradient, and the distribution of the second reinforcement component has a density that increases according to a second gradient toward the outer surface of the preform.

According to some embodiments, the metal matrix material includes a metal or a metal alloy and the second reinforcement component includes a ceramic particle component and/or a ceramic fiber component. Some examples of metals and/or metal alloys that may be used include, but are not limited to, aluminum, magnesium, or alloys thereof In addition, in some cases, the first reinforcement component includes a ceramic particle component and/or a ceramic fiber component. As noted above, some embodiments provide a transition region proximate the outer surface of the preform. For example, the transition region may begin at the preform interface and extend out away from the preform outer surface. In some cases the transition region has a thickness that corresponds to an amount of the metal matrix material infiltrated into the preform.

In some cases the distribution of the second reinforcement component at the preform's outer surface may be configured to match a corresponding distribution of the first reinforcement component within the preform, opposite the outer surface from the second reinforcement component distribution. For example, in some cases the distribution of the second reinforcement component at the outer surface of the preform may have a first volume fraction that matches a volume fraction of the first reinforcement component at the outer surface of the preform. In some cases, the metal matrix composite material comprises the second reinforcement component at a minimum volume fraction, less than the first volume fraction. In some cases, the volume fraction of the distribution of the second reinforcement component decreases linearly or substantially linearly from the first volume fraction to the minimum volume fraction as the distribution moves away from the preform outer surface.

As will be discussed, it is contemplated that many different examples of metal matrix composite articles can be made according to the teachings provided herein. As just one example, in some cases, a MMC article in the form of a cast brake rotor is provided. In such a case, the friction face of the brake rotor may be considered the first region of the MMC article and the brake rotor hub may be considered the second region. A transition region may be considered to be a portion of the brake rotor that is positioned between the hub and the friction surface. Further, as will be discussed, some examples of the invention may provide a second preform also positioned in the first region of the body adjacent to the first preform. The second preform may also be infiltrated by at least the metal matrix material of the metal matrix composite material.

Some embodiments disclosed herein provide a method for making a variable-density preform, which may in some cases be used in a method for making an MMC article. According to some embodiments, a method for making a variable-density preform includes providing a preform slurry comprising a liquid component, at least a first reinforcement component, and a first density. The method also includes depositing a first layer of the preform slurry at the first density onto a working surface. After depositing the first layer, the method includes changing the density of the preform slurry from the first density to a second density and depositing a second layer of the preform slurry at the second density on top of the first layer of the preform slurry. In some cases the method also includes removing the liquid component from the preform slurry as it is deposited on the working surface, and may include drying the layers of the preform slurry deposited on the working surface to remove residual amounts of the liquid component. In some examples, the first and the second layers of the dried preform slurry include a reinforcement density gradient corresponding to the first density and the second density, respectively.

According to some embodiments, a method for making a variable-density preform includes changing the density of the preform slurry from the first density to the second density. In some cases, the changing of the density occurs as at least a second reinforcement component is added to the preform slurry. The second layer of the preform slurry includes at least the first reinforcement component and the second reinforcement component. In some cases, a method for making a variable-density preform also includes changing the density of the preform slurry from the second density to a third density by removing the first reinforcement component from the preform slurry. The method can then include depositing a third layer of the preform slurry at the third density on top of the second layer, the third layer comprising the second reinforcement component but not the first reinforcement component.

In some cases layers of the preform slurry may be deposited on the working surface by at least one of pouring the preform slurry on the work surface and spraying the preform slurry on the work surface. In addition, in some cases the working surface may include a vacuum table that allows for removing the liquid component from the preform slurry either as it is being deposited and/or after it has been deposited on the working surface. The first and second reinforcement components may include a variety of reinforcing materials. In some cases, the first reinforcement component is a reinforcement fiber component or a reinforcement particle component. For example, the reinforcement components may include a ceramic material in particle and/or fiber form. According to at least some embodiments, the first reinforcement component comprises a reinforcement fiber component and the second reinforcement component comprises a reinforcement particle component.

In additional embodiments, a method for making a variable-density preform may also include pressing the first and the second layers of the preform slurry to a desired thickness. In some cases the method may also include changing the density of the preform slurry from the second density to two or more additional densities, and then depositing corresponding layers on the working surface to build up the preform. For example, methods for making variable-density preforms may provide for changing the density of the preform slurry three times and depositing at least three layers. In other examples, a fewer or greater number of densities and/or layers may be used.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

FIGS. 1A-1D depict a flow diagram illustrating a method for making a cast article, using a cavity and a preform, according to an embodiment of the invention.

FIG. 2A is a partial cross-sectional image of a cast article depicting a material interface and a functional reinforcement gradient according to an embodiment of the invention.

FIG. 2B is a magnified view of a portion of FIG. 2A.

FIG. 2E is a magnified view of a portion of FIG. 2A.

FIGS. 2F-2H are magnified views of portions of FIG. 2E, illustrating different material densities within the cast article of FIG. 2A according to an embodiment.

FIG. 3 is a perspective view of a brake assembly according to an embodiment.

FIG. 4A is a perspective view of a brake rotor according to an embodiment.

FIG. 4B is a partial, sectional illustration of a brake rotor according to an embodiment.

FIG. 4C is a partial, sectional illustration of a brake rotor illustrating changes in ceramic density according to an embodiment.

FIGS. 5A-5F illustrate a method of making a metal matrix composite brake rotor according to an embodiment.

FIG. 7A is a collection of consecutive partial, cross-sectional images of a cast article incorporating a novel preform according to an embodiment.

FIGS. 7B-7D are magnified views of portions of the images of FIG. 7A, illustrating different material densities within the cast article of FIG. 7A according to an embodiment.

FIG. 10 illustrates a spray-deposition method for making a variable-density preform according to an embodiment.

FIG. 11A is a perspective view of a working surface for making a variable-density preform according to an embodiment.

FIG. 11B is a perspective, cross-sectional view of the working surface in FIG. 11A according to an embodiment.

FIG. 12 is a perspective view of a press step for a method for making a variable-density preform according to an embodiment.

DETAILED DESCRIPTION

Figure 2C:
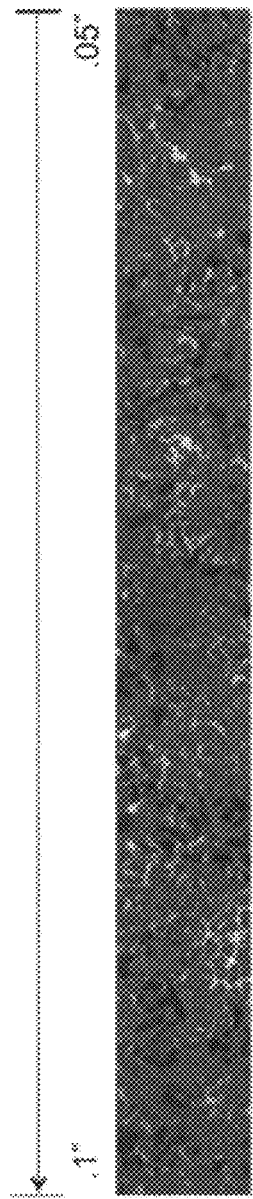
FIGS. 2C and 2D are magnified views of portions of FIG. 2B, illustrating portions of the functional reinforcement gradient.

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments described herein are generally related and applicable to casting processes, including metal casting. Many examples described herein are related to or in various ways address the properties of metal matrix composites, including articles, components, and parts cast with a metal matrix composite ('MMC'). Examples are also related to methods for reinforcing such cast articles, and to particular structures used for reinforcement. For example, some embodiments discuss the use of casting preforms that may be placed in a mold cavity and infiltrated with a molten metal matrix composite to form an MMC article that is reinforced at least in part by the preform.

Also, some embodiments discuss the formation of additional reinforcement members having tailored properties and structures. Some examples include the formation of distribution(s) of a reinforcement component within a casting preform, such as a reinforcement distribution that increases in density according to a particular gradient. Additional examples include the formation of distributions of reinforcement components within a portion of the MMC article next to, but not within, a preform. As will be discussed, in some embodiments such a distribution of a reinforcement component may form as a metal matrix composite infiltrates a preform.

As will be appreciated as one reads further on, the disclosure provides a number of practical examples for embodying the concepts and features taught herein. One example is a lightweight metal matrix composite brake rotor. Another example is a MMC brake drum. As will be discussed, the novel structures within, and methods of forming, such components provided by embodiments of the invention can offer significant benefits over conventional cast iron brakes. For example, some embodiments provide the ability to tailor the structure and the properties of these types of components to meet certain variable and often severe thermal and mechanical loadings. In addition to the thermal and mechanical attributes, the MMC technology disclosed herein can also be employed in a cost-effective method for producing brake rotors. Of course, it should be appreciated that the embodiments described herein are examples of different products, articles, systems, and/or methods, and are not meant to limit the scope of possible embodiments or their application.

Turning to FIGS. 1A-1D, a method 100 for making a cast article 102 is illustrated according to an embodiment of the invention. Referring to FIG. 1A, a die cavity 104 is schematically shown with a porous casting preform 106 inserted within the cavity 104 at one end. FIG. 1A also shows the remaining portion of the cavity 104 filled with a molten metal matrix composite material 108, in this example containing an aluminum effluent (Al) carrying a ceramic reinforcement component (C). Initial steps in the exemplary method include providing the porous preform 106, positioning the preform 106 within the die cavity 104, and introducing the molten metal matrix composite material 108 into the die cavity 104 about the preform 106.

In general terms, the porous preform 106 in this example is formed with a porous structure made of a reinforcing material, such as a ceramic particles and/or ceramic fibers (e.g., continuous and/or discontinuous). Referring to FIG. 1A, the preform a first end 110, a second end 112, an outer surface generally indicated at 114 in this cross-sectional view. The reinforcing material, which is also referred to as a reinforcement component, is illustrated as a distribution of reinforcement particles 116, though it should be appreciated that fibers and/or other types of reinforcement components may also be used to make the preform 106.

According to some embodiments, the reinforcement component 116 has a density that increases between the first end 110 of the preform and the second end 112 of the preform according to a first gradient. FIGS. 1A-1D include simplified schematic representations of the preform 106, and thus do not depict a visible gradient of the reinforcement component's density, but it should be appreciated that the reinforcement component 116 is distributed throughout the preform 106 according to such a gradient in many (though not necessarily all) embodiments.

According to some embodiments, the preform 106 and/or one or more additional preforms placed within a cast component, can be manufactured with a reinforcement distribution having a gradient according to the teachings of Applicant's co-owned U.S. Pat. No. 8,075,827 B2, titled "Variable-Density Preforms," and issued Dec. 13, 2011, the content of which is hereby incorporated by reference in its entirety. As discussed in the '827 patent, Applicant often refers to such material gradients as Functional Reinforcement Gradients ('FRG'). Briefly referring to the teachings of the '827 patent, in some embodiments a Functional Reinforcement Gradient (e.g., gradient distribution of a reinforcement component) can be formed by establishing a flow of a ceramic slurry into a mold and then filtering the slurry so as to extract and remove the liquid, thereby creating (or leaving behind) a functional gradient of the ceramic reinforcement media contained in the slurry. In some embodiments, such processes can yield an FRG with a maximum reinforcement density of approximately 30% to 45% by volume on a friction surface of a preform.

As discussed above, currently available technology for reinforcing castings with preforms can provide a highly reinforced section of a casting that includes the reinforcing preform. In infiltration casting, a metal or metal alloy is typically introduced into the die cavity to infiltrate the preform and also to fill other portions of the cavity to form unreinforced portions of the casting. As noted above, such state of the art examples of infiltration casting may provide a more integrated, infiltrated preform with a greater degree of contact between reinforcement and matrix materials. Even so, the materials still exhibit abrupt and problematic differential coefficients of thermal expansion ('CTE') between the matrix material and reinforcement member. Such abrupt transitions in CTE at the matrix-reinforcement interface boundaries can give rise to residual stress during the forming process (e.g., residual stress-concentration), and also manifest in stress fractures during thermal cycling of the reinforced components during service.

According to some embodiments of Applicant's invention, MMC components and articles are provided with one or more variable-density reinforcement components that provide improved thermal and mechanical performance when compared with previous reinforcement techniques. As just one example, in some cases Applicant's reinforcing techniques can provide cast article in which the volume fraction of reinforcement can range from a very high reinforcement level (e.g., 35-45% vol. on the frictional surface discussed above) to a very low or nearly 0% reinforcement level in other areas of the casting. Providing a casting with a wider range of changing reinforcement densities along a wider or longer dimension of a casting, and especially in the vicinity of material interfaces, can thus reduce, limit and/or minimize the CTE differences between materials, thus also reducing the residual stress and stress fractures due to thermal cycling.

As will be discussed in greater detail further herein, applications of embodiments of the invention are well suited for, but not limited to, automotive and airplane applications, including rotor brake systems for heavy trucks and/or trailers. Embodiments disclosed herein provide one or more advantages or features over past practices. For example, two-piece rotors have been used in industry (e.g., Brembo, Performance Friction) to date because it is extremely difficult to maintain rotor flatness during a transient braking event. As noted above, the instant application discloses embodiments that overcome this and/or other deficiencies. In one example, the use of a functional reinforced gradient can assist in overcoming these types of problems.

Returning to FIGS. 1A-1D, an improved functional reinforcement gradient can be built up while the metal matrix composite material 108 is infiltrating the preform 106. In this case the molten metal matrix composite material 108 includes at least a liquid component or effluent 120, which in this example is illustrated as aluminum (Al). The MMC material 108 also includes a reinforcement component 122 carried by the liquid component 120. As shown in FIGS. 1B and 1C, the method 100 includes pressurizing 124 the molten MMC material 108 (e.g., through squeeze casting).

As the material 108 is pressurized, the liquid component 120 infiltrates into the porous preform 106, while passage of the reinforcement component 122 is limited and/or blocked by the structure of the preform 106. As more of the liquid component 120 infiltrates into the preform 106, the preform continues to filter out the reinforcement component 122 in the molten MMC, thus creating a buildup of the reinforcement component 122 starting at the outer surface 114 of the preform (i.e., the interface between the preform 106 and the MMC material 104). The buildup forms a distribution of the reinforcement component that extends away from the material-preform interface 130. According to the operation of this embodiment, the distribution of the reinforcement component 122 forms with a density that increases according to a gradient 132 in the direction toward the interface 130 and the outer surface of the preform. For example, in some cases the density of the reinforcement material 122 may increase at a substantially linear or linear rate as it approaches the material interface 130.

Continuing with reference to FIGS. 1A-1D, in one non-limiting exemplary embodiment, the effluent 120 is a light metal alloy (e.g., aluminum, magnesium, or silicon) that contains a percentage of ceramic reinforcement component 122. As shown in this example, the MMC material is formed from a mixture of 90% volume aluminum and 10% volume ceramic reinforcement (e.g., short fibers and/or particulate). Such a material composition may be provided by the commercially available material Duralcan, which contains 10% SiC particulate. In accordance with the embodiment, the preform 106 is then used to filter or hold back/retain the particles as the effluent passes through. This creates an accumulation of the particulate as it begins to dam against the outer surface 114 of the preform 106. According to the illustrated embodiment, the porous preform 106 has an average of approximately 40% ceramic reinforcement and approximately 60% void that is infiltrated by the effluent.

According to one non-limiting embodiment, the preform 106 thickness may be designed for use as the friction surface of a brake rotor. In one example, the preform thickness is set at approximately 0.234" thick (approximately 6 mm) for a square inch. This is approximately 0.234 cubic inches of volume, of which approximately 0.1404 cubic inches (approximately 60%) is void (0.1404 cubic inches=0.60*0.234 cubic inches). In this example, the volume fraction of reinforcement 122 at the interface 130 will build to equal the preform reinforcement volume fraction of approximately 40% and decrease linearly away from the interface 130 as the alloy 120 is pressed from the stir cast MMC material 108 into the preform 106. The volume fraction of reinforcement 122 then decreases until it is approximately the same as reinforcement level of the original MMC stir cast volume fraction (i.e., approximately 10% in this example). The thickness of the transition zone at the interface can then be determined by a slope determined according to the volume of alloy lost to the preform and the velocity of the shot.

According to some embodiments, the process by which the Functional Reinforcement Gradient 132 forms has some similarities with Applicant's novel process for forming Functional Reinforcement Gradients within variable-density preforms, as taught in Applicant's co-owned U.S. Pat. No. 8,075,827 B2. As in the example of casting a preform, embodiments of the instant invention employ a filtering mechanism provided by a configured, porous media, which in this case is a preform disposed in the die cavity. Accordingly, instead of requiring additional or external filtering materials to build the functional reinforcement gradients within a cast article, embodiments disclosed herein advantageously incorporate a filtering mechanism designed into the reinforcement preform that will already be used for reinforcing a portion of the cast article.

Turning now to FIGS. 2A-2H, several partial images of an exemplary MMC cast article 200 that includes a body formed from a MMC material 202 and a preform 204 at least partially infiltrated by the MMC material 202. FIG. 2A is a partial cross-sectional image of the cast article 200 depicting a material interface 206 located between the preform 202 and the MMC material 204. According to some embodiments, the cast article 200 can be considered as having multiple material regions of different compositions. For example, referring to FIGS. 2A and 2B, the article body includes a first region 210 generally located in the vicinity of the infiltrated preform. The article also includes a second region 212 generally located opposite the interface 206 from the preform 204 in an area of the article formed from the MMC material 202. Accordingly, the first region 210 (e.g., by the preform) typically has more reinforcement than the second region 212, which does not have the additional reinforcement from the preform 204.

Both the metal matrix composite material 202 and the preform material 204 include reinforcement components, which may be the same or different depending upon the particular embodiment. In this example, the MMC material 202 includes an Al—Si metal alloy that carries an 8% volume SiC reinforcement component. The preform 204 is formed from an approximately 40% volume aluminum hybrid composite, thus also containing a reinforcement component. The preform 204 is configured to allow passage of the Al—Si metal alloy into the preform and to block or reduce passage of the SiC reinforcement component. During casting, as the SiC reinforcement component was blocked, a distribution of the SiC reinforcement component built up adjacent to the outer surface of the preform, with the density of the distribution increasing according to a gradient toward the material interface 206. As shown in the magnified view of FIG. 2B, the functional gradient of the SiC reinforcement component increases through a transition region 220 of the material until it reaches the material interface 206.

Figure 2D:
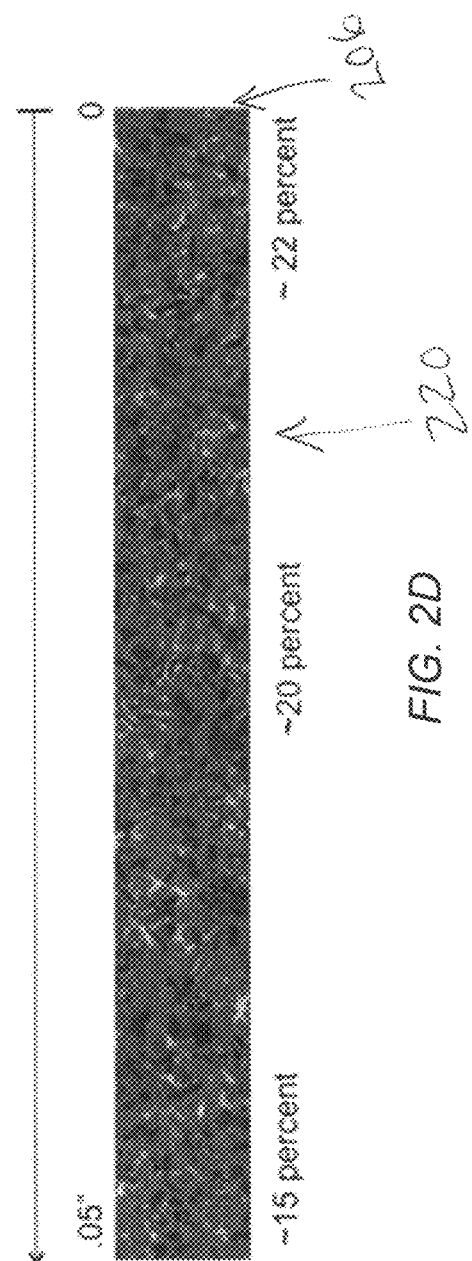
Figure 5E:
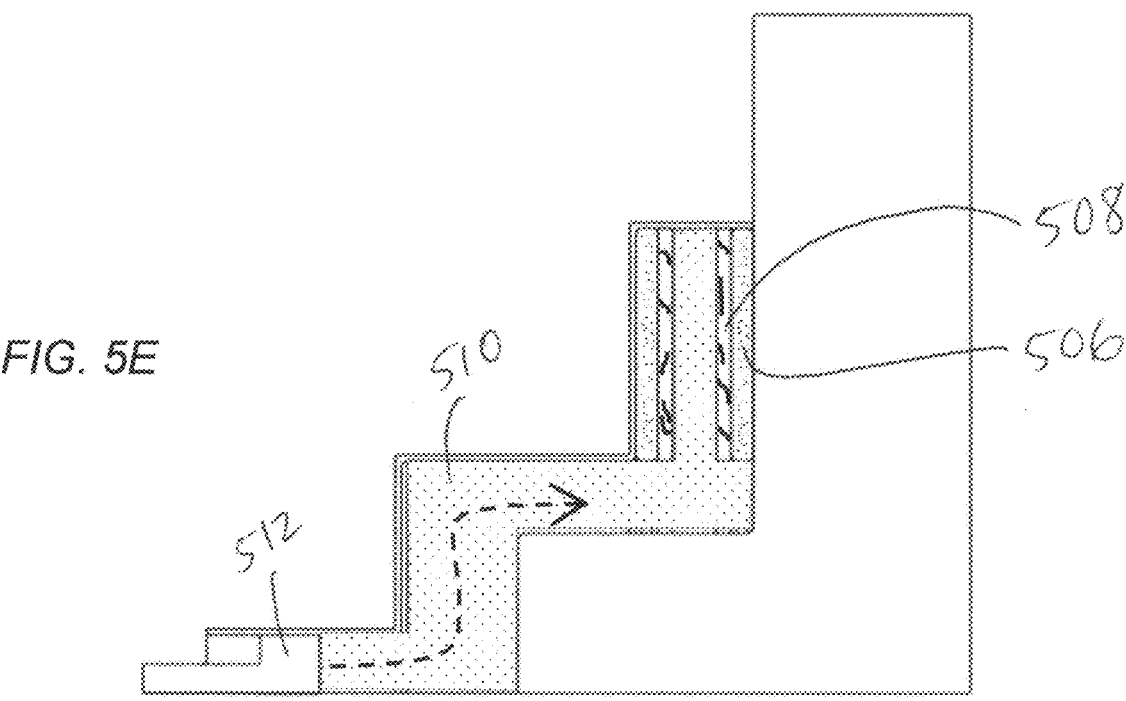
Figure 5F:
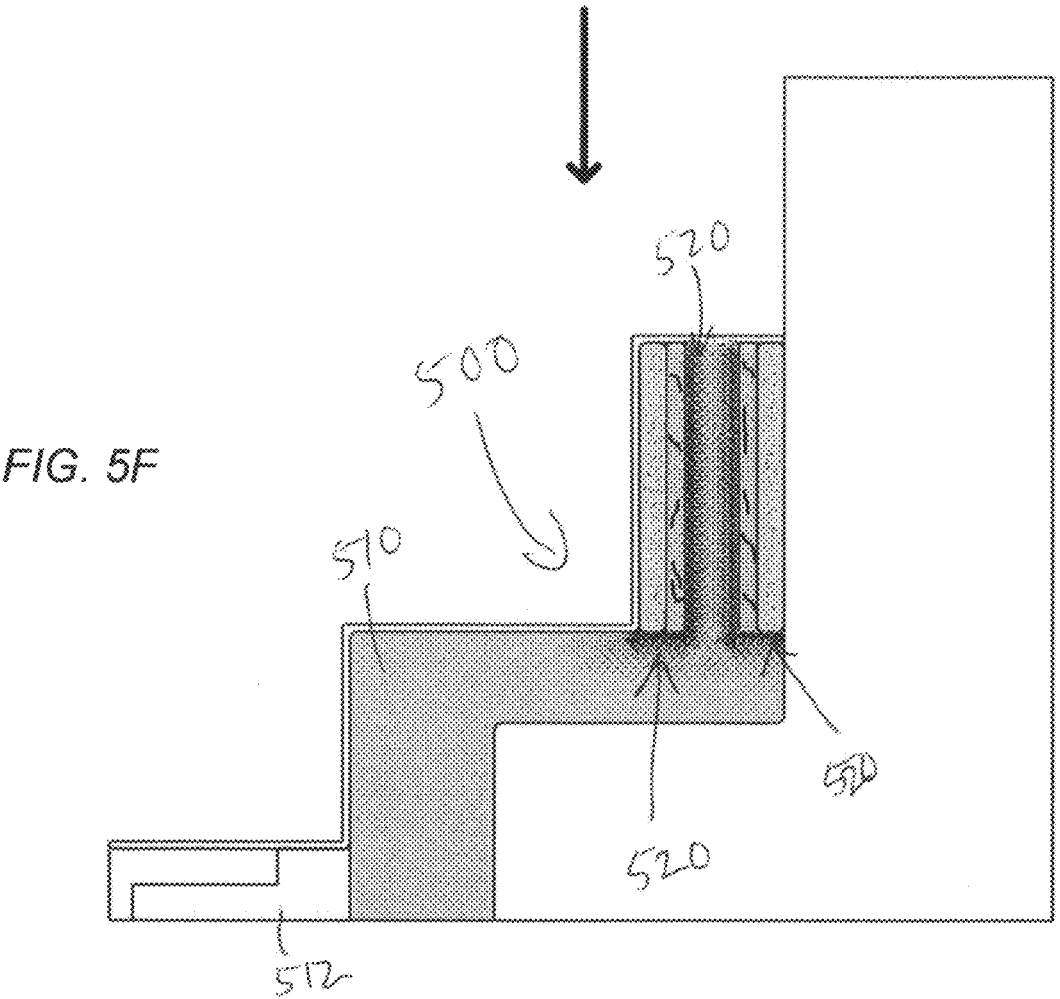

FIGS. 2C and 2D are magnified views of portions of FIG. 2B, illustrating portions of the functional reinforcement gradient within the transition region 220. As shown, the SiC reinforcement component has built up to a density of about 22% volume at the 0" mark, which is close to the material interface 206. The density of the SiC steadily decreases further away from the material interface 206 according to the functional gradient until the density of the reinforcement component reaches an equilibrium with the level of SiC (e.g., 8% volume) within the original MMC material 202.

FIG. 2E is a magnified view of a portion of FIG. 2A, showing a closer view of the material interface 206 and identifying the locations of the magnified views in corresponding FIGS. 2F, 2G, and 2H. FIG. 2F provides a closer view of the original composition of the MMC material, which includes the Al—Si alloy carrier component and the 8% volume SiC reinforcement component. As can be seen in FIG. 2G, the density of the SiC reinforcement component is much higher at points nearer to the material interface 206.

FIG. 3 is a perspective view of a brake assembly 300 according to an embodiment of the invention. As discussed above, embodiments of the invention can be useful in automotive applications, and particularly suited to automotive, heavy truck, and/or trailer brake rotor systems. As noted above, embodiments of Applicant's invention can be useful for limiting and/or overcoming problems associated with different coefficients of thermal expansion (CTE) in adjacent materials.

As is generally known in the art, when a brake is used for slowing and/or stopping a moving object, the motion of the object gets transformed into heat and transferred to the brake disc in order to stop the moving vehicle. Upon application of the brake actuator the disk is clamped between the brake pads and rotational drag is created. This clamping causes energy transformation to take place and heat is generated. Under certain operating conditions, the heat energy does not get transferred to the disk uniformly over the whole surface due to the differences in tangential (or linear) velocities along the radius of the brake pad interface. The tangential speed of the brake rotor at any radial distance, r, from the rotor center is defined as the product of $2\pi r$ and the rotational speed (i.e., $((2\pi r) \times (RPM))$. As will be apparent, a higher velocity found at the outer positions corresponds to a higher thermal energy state (i.e. higher temperatures). Therefore, the rotor thermal load carrying abilities at the outer locations needs to handle the higher heat energy generated there.

In accordance with an embodiment, higher heat capacity/handling can be accomplished through placement of a higher concentration of ultra-high temperature ceramic material at specific locations on the rotor. In some embodiments, the coefficient of thermal expansion (CTE) is tailored with the changing of the ceramic component in the MMC content such that the rotor will expand and contract while remaining in-plane. Control of expansion and contraction is not possible if a monolithic material such as cast iron is used in a brake rotor. This is one of the reasons why 'brake jitter' is noticed in a monolithic cast iron automotive braking system.

Accordingly, some embodiments disclosed herein provide the ability to control the expansion and contraction of the rotor during braking (e.g., due to heating and cooling), enabling embodiments of the rotor(s) of the invention disclosed in the instant disclosure to be 'hard mounted' to the hub. While other material options may contain better material properties in terms of maximum operation temperatures, the ability to tailor (or customize) the FRG material properties as taught herein allows for effective mounting of the friction surfaces directly to the hub section of the rotor and more effective thermal management to avoid brake fade (i.e., reduced breaking action).

In accordance with some embodiments of the invention, the volume fraction of ceramic in the brake rotor changes across the braking surface extending between the inside and the outside diameters of the rotor. For instance, in a non-limiting exemplary embodiment, a location or section proximate the outermost extent (for example proximate the circumference) of the brake disc can include approximately 40% to 45% by volume of ceramic reinforcement and approximately 55% to 60% by volume of one or more light alloy; whereas at some location other than the outermost extent, e.g., proximate the hub or at a section or location between the hub and the circumference, the brake disc can include approximately 30% to 35% by volume of ceramic reinforcement and approximately 65% to 70% by volume of one or more light alloy. A method for making such changes in volume fraction is taught by Applicant's granted patent, U.S. Pat. No. 8,075,827 B2, titled "Variable-Density Preforms" issued Dec. 13, 2011.

In some cases distinct zones and interfaces between zones are provided. For example, certain embodiments of brake rotors include at least three functional zones, viz., a) friction interface (heating zone), b) venting (cooling zone) and c)

mounting hub (torque transfer zone). In some cases these zones should or must have specific material attributes for the rotor, as a whole, to function properly. They also must have the proper interfaces between the zones. High ceramic on the rotor's breaking surface, for example proximate the outermost extent, must be graded to a lower ceramic content in the radial direction extending between the circumference and the hub, and through the thickness toward the internal venting.

In some cases an exemplary design according to some embodiments involves the use of two preforms to cast an article such as a blade or brake rotor. In some cases the two preforms are functionally graded in the radial direction. In some embodiments, the blades are infiltrated during the casting process that creates all of the rotor geometry such as, but not limited to, the hub, venting, and blade section, etc.

In certain embodiments, the effluent (or slurry) can be, but is not limited to, an aluminum or magnesium alloy containing ceramic particles and/or fibers.

In some embodiments, the at least one exit end or orifice can be, but is not limited to, a functionally graded porous preform.

In certain embodiments, a secondary gradient can be developed at the metal-preform interface of a cast article.

In some embodiments, the functional gradient in the interface regions can serve, but is not limited to, one or more of the following: (1) to provide a continually changing ceramic structure so as to minimize the stress riser at the interface from the mechanical loading; and/or (2) to grade the differences in the CTE at the interface to reduce the thermal stresses developed at the interface. In a braking event, the thermal load is just as important if not more important than that of the mechanical load.

In some embodiments of the invention, the thickness of the FRG can be altered by changing one or more of the density or the thickness or the composition of the preform in the die cavity. In certain embodiments, the preform and the incoming ceramic carrying aluminum can be tailored such that a predetermined FRG is achieved at the one or more interfaces. In some embodiments, the fraction of the fiber and/or particle combination can be altered to increase or decrease the thickness of the transition region.

Accordingly, in some embodiments, the preform can contain ceramic particles or continuous ceramic fibers or discontinuous ceramic fibers or any combination thereof in an amount ranging between approximately 5% to approximately 70% by volume. In certain embodiments, the incoming alloy or slurry can include ceramic particles and/or ceramic fibers in an amount ranging between approximately 5% to 40% by volume. In some embodiments, vibration can be induced during the molding process to initiate and/or enhance the dispersion of the ceramic for providing a predetermined gradient.

As is well known in the art, different materials have different coefficients of thermal expansion (CTE) and therefore each expands at a different rate when heated. Accordingly, if different material having different CTE are attached to one another, the thermal stress at the interface and in the vicinity thereof can be substantially, and in some cases significantly, high when heated. Accordingly, providing or creating an FRG can reduce, minimize, and/or eliminate such thermal stresses as may arise due to the differences (or mismatch) in the CTE of the material used in the rotor.

Thermal stress in a constrained material is defined by $\sigma = \alpha E \Delta T$ where $\sigma$ is thermal stress, $\alpha$ is the material's coefficient of thermal expansion (CTE), E is the material's Young's modulus and $\Delta T$ is the change in temperature. The CTE ($\alpha$) of unreinforced aluminum is approximately 22.9 μm/m-° C. (in the temperature range of approximately 20° C. to approximately 300° C.); whereas for a 40% SiC particulate reinforced aluminum, the CTE ($\alpha$) is approximately 11 μm/m-° C. Accordingly, at approximately 300° C., the stress in the aluminum and at the interface between the aluminum and the MMC, respectively, would be $$\sigma_{Al-MMC} = ((22.9-11 \text{ μm/m-°C.})*124E9 \text{ N/m}^2 * 300° \text{ C.}) = 443.39 \text{ MPa}$$

$$(64.26 \text{ ksi})\sigma_{Al} = ((22.9-11 \text{ μm/m-°C.})*69E9 \text{ N/m}^2 * 300° \text{ C.}) = 246.33 \text{ MPa (36 ksi)}$$

This indicates that failure would occur in the MMC as the stress in each material is at the yield point of many alloys at room temperature and exceeds the yield of almost all reinforced and unreinforced aluminum alloys at 300° C. This is why a functional gradient can be desirable at this interface in some cases. If an incremental change in volume fraction is implemented, the thermal stress can be effectively managed.

Taking the same temperature change as above but with an incremental CTE difference (directly related to volume fraction of ceramic in the MMC by rule of mixtures), the stress at the interface is computed as:

$$\sigma_{Al} = ((22.9-20 \text{ μm/m-°C.})*69E9 \text{ N/m}^2 * 300° \text{ C.}) = 60 \text{ MPa (8.7 ksi)}$$

$$\sigma_{Al-MMC} = ((22.9-20 \text{ μm/m-°C.})*124E9 \text{ N/m}^2 * 300° \text{ C.}) = 108 \text{ MPa (15.7 ksi)}$$

The resultant thermal stress is more manageable in both materials and hence will be able to handle the repeated loadings it will experience during braking events.

Accordingly, in an embodiment having the interface modification in accordance with an embodiment of the invention, the high volume fraction reinforcement can be graded to a low or no reinforcement smoothly.

Machining attributes—SiC reinforced alloys are known to be very difficult to drill and tap. The ability of putting high levels of reinforcement only on the braking surface helps reduce machining time and cost. Historically, the rotors that have been in production in automotive applications have been fully reinforced all the way to the hub.

In some embodiments, the friction face may contain up to approximately 45% ceramic while the hub of the rotor is >approximately 5% ceramic.

FIG. 4A is a perspective view of a brake rotor 400 according to an embodiment. As shown in the figure, the rotor 400 includes an outer diameter 402, an inner diameter 404, a hub portion 406, and at least one friction face 408. FIG. 4B is a partial, sectional illustration of a somewhat similar brake rotor 420 according to an embodiment of the invention. In this example, the brake rotor 420 includes two disc-shaped preforms 422, 424, which form the friction faces of the rotor. The figure also illustrates the rotor's hub 428 and venting features 426. FIG. 4C is a partial, sectional illustration of a somewhat similar brake rotor 450 illustrating changes in ceramic density according to an embodiment. As shown in the illustration, in this example the brake rotor 450 is formed with a preform 452 in a first reinforcement region 454. The preform 452 is formed with a first functional reinforcement gradient 456 that decreases in density at points moving away from a first end 460 of the preform. At a second end of the preform, the rotor 450 includes a transition region 470, which begins at a macro interface between the preform region of the rotor and a less reinforced region 472 of the rotor connecting the first region 454 with a hub region 474. As explained above with respect to other embodiments, the transition region 470 includes a second functional reinforcement gradient that decreases in density of reinforcement material as it moves away from the interface with the preform region. This smoothing of the changes in reinforcement between regions of the rotor can significantly enhance both thermal and mechanical wear properties of the rotor as discussed above.

FIGS. 5A-5F illustrate a method of making a metal matrix composite brake rotor 500 according to an embodiment. As shown in the figures, two preforms 502 are press fit within a rotor die 504 as an initial step. In some cases, the preforms 502 may include multiple material layers, including, for example, SiC 506 and an alumina fiber layer 508. A metal matrix composite material 510 is injected into the die 504 and pressurized with a piston 512 until the material infiltrates the preforms 502, thus forming functional reinforcement gradients 520 extending from the outside surface of the preforms in a manner discussed above. As shown in this case, a multi-dimensional functional reinforcement gradient scheme can thus be achieved.

Figure 6A:
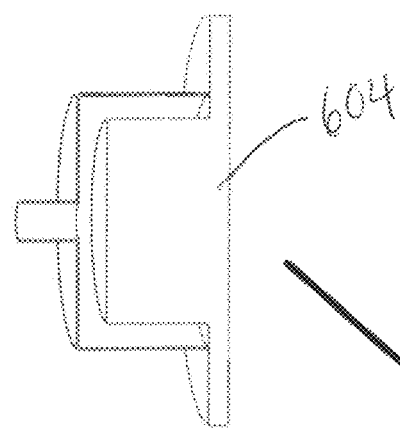
FIGS. 6A-6D illustrate a method of making a metal matrix composite brake drum according to an embodiment.
Figure 6B:
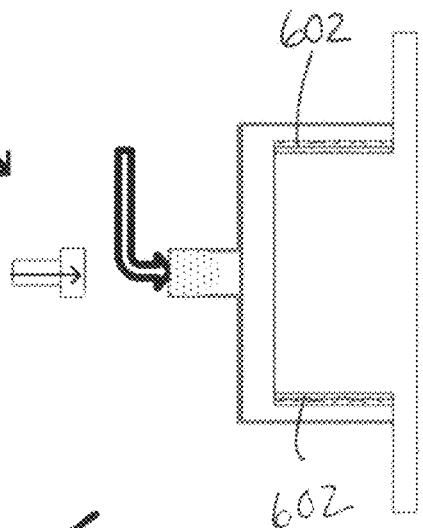
Figure 6C:
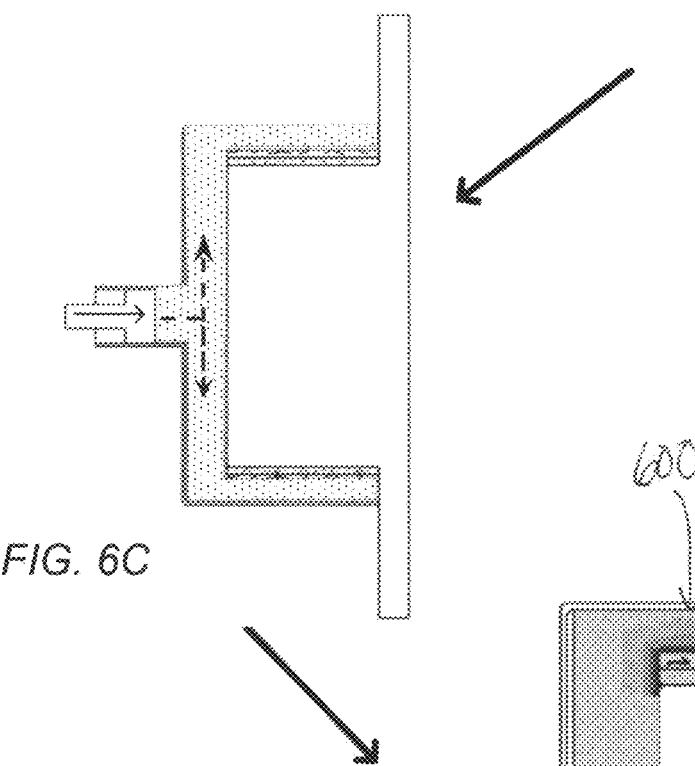
Figure 6D:
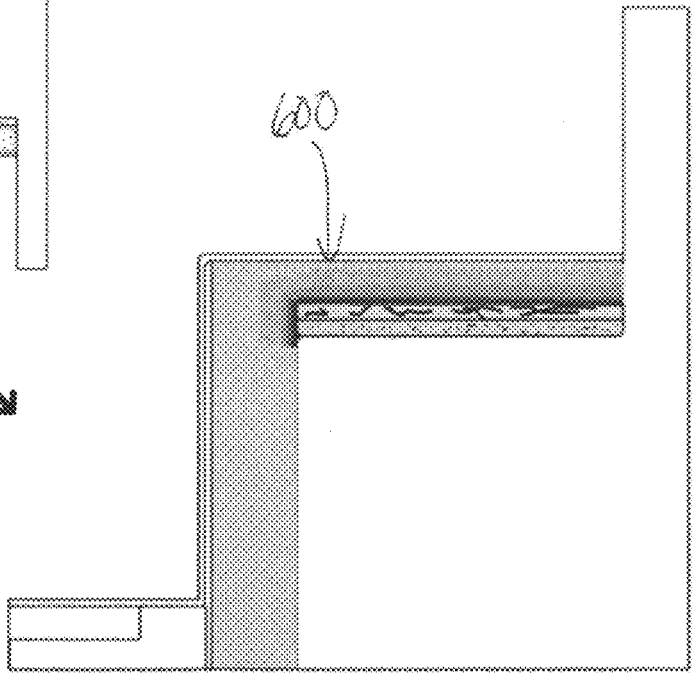

FIGS. 6A-6D illustrate a method of making a metal matrix composite brake drum 600 according to an embodiment similar in some respects to the example shown in FIGS. 5A-5F. FIGS. 6B and 6C illustrate the preform 602 press fit around the die 604 in a cross-sectional view.

Figures 7A, 7B, 7C, 7D:
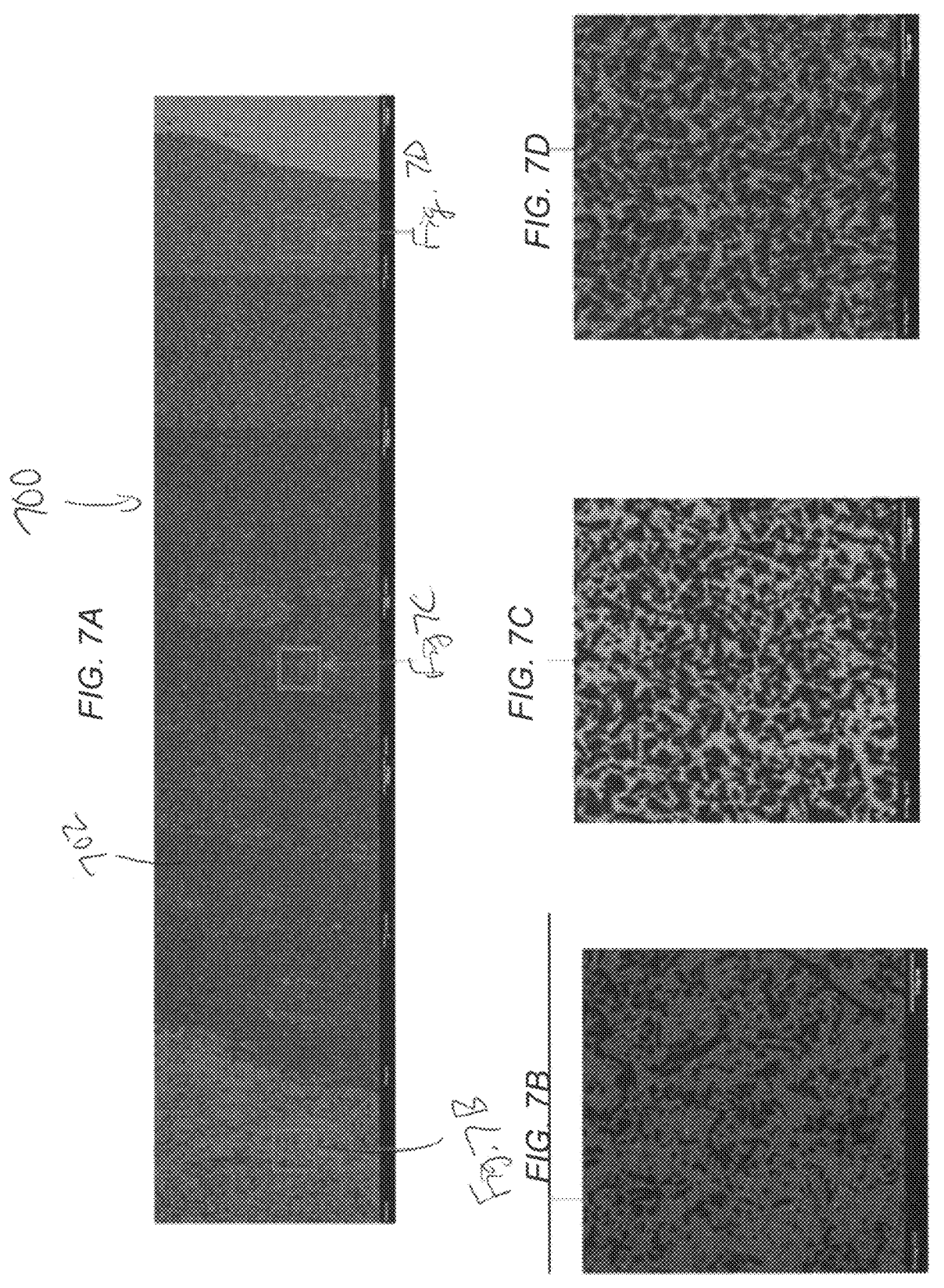

FIG. 7A is a collection of consecutive partial, cross-sectional images of a cast article 700 incorporating a novel preform 702 built according to a preform spray/deposition method according to an embodiment. FIGS. 7B-7D are magnified views of portions of the images of FIG. 7A, illustrating different material densities within the cast article of FIG. 7A according to an embodiment.

In accordance with an embodiment of the invention, a similar resultant FRG MMC structure can be obtained by a spray application of the preform. A non-limiting exemplary embodiment includes a process by which a high concentration of particles is used in a preform slurry and sprayed thru a nozzle (e.g., a venturi nozzle) onto a heated surface or plate on which vacuum is applied (to drive off the excess water/effluent). In some embodiments of the invention, the slurry composition can then be altered after the desired build up of ceramic structure to a higher fiber containing mix to create a less dense ceramic structure. In certain embodiments of the invention, such build up of an FRG can provide a structure similar to that previously described without the need to cast with a ceramic containing alloy. In accordance with an embodiment of the invention, the preform can be dried and fired, as previously described, to dry out moisture and/or burn out organic binders and/or sinter the inorganic binders to yield a preform ready for casting. In accordance with an embodiment of the invention, the structure can then be cast using a pressure infiltration method (e.g., squeeze casting). The figure below illustrates a non-limiting exemplary embodiment of a structure within a casting manufactured in accordance with an embodiment of the invention.

In some embodiments, the preform mix progresses from all fibers to a combination of low fibers and high particles to all particles. The light area, in an embodiment of the invention, is the alloy that has infiltrated the mix.

In some embodiments, the preform mix progresses from all fibers to a combination of high fibers and low particles to a combination of low fibers and high particles to all particles.

In certain embodiments, the disclosed spraying process of the instant invention could be used to spray an existing preform (e.g., a preform having high volume of SiC particles) with a fiber-particle layer and then a fiber layer prior to squeeze casting so as to minimize stress concentrations that may arise due to differences in, and not limited to, the CTE and stiffness at one or more interfaces of mating materials.

In some cases a process by which a high concentration of particles is used in a preform slurry and sprayed or deposited thru a venturi nozzle or otherwise deposited onto a heated or unheated surface or plate on which vacuum and/or a centrifugal force is applied (to drive off the excess water/effluent). The slurry composition can then be altered after the desired build up of ceramic structure to a higher or lower fiber ceramic containing density mix to create a less/or more more or less dense ceramic structure. This build up of an FRG obtains a similar structure to that above without the need to cast with a ceramic containing alloy. This preform is dried and fired in the same common practice as before spelled out in authors' patent, but the drying process may also be used in between compositional layer changes as well. To This drying process driesy the final moisture out, burns out the organic binders and to sinters the inorganic binders to obtain a preform ready for casting.

This structure can then be cast using a pressure infiltration method (i.e. squeeze casting). The final structure of the casting is seen below. The preform mix moves from all fiber to low fiber-high particle to all particle mix. The light area is the alloy that has infiltrated the mix. According to some embodiments, the spray or deposition method can be carried out according to the teachings of Applicant's co-owned U.S. Patent Application Publication No. US 2013/0169901, published Oct. 17, 2013, and filed Mar. 15, 2013, the content of which is hereby incorporated herein by reference in its entirety.

Figure 8:
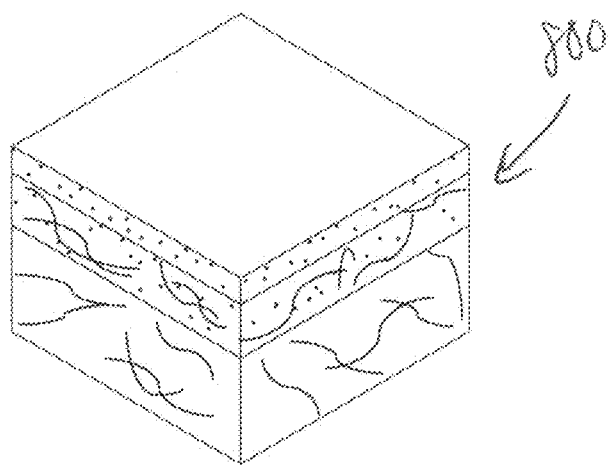
FIG. 8 is a partial, perspective view of a variable-density preform according to an embodiment.
Figure 9A:
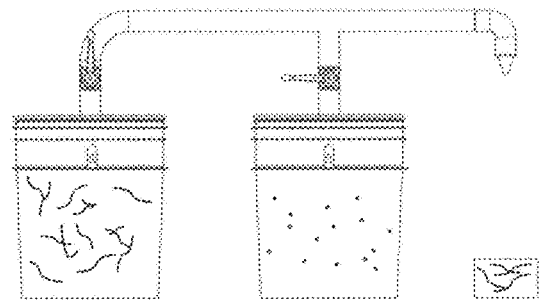
FIGS. 9A-9C illustrate a deposition method for making a variable-density preform according to an embodiment.
Figure 9B:
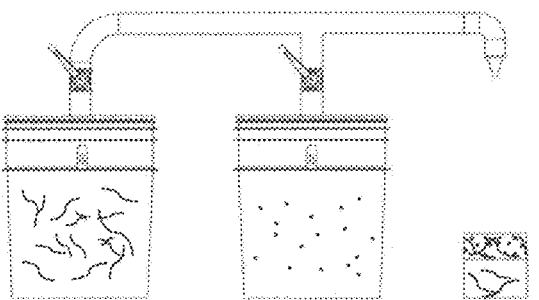
Figure 9C:
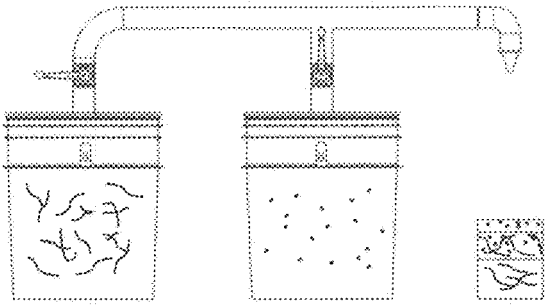

FIG. 8 is a partial, perspective view of a variable-density preform 800 according to an embodiment. FIGS. 9A-9C illustrate a deposition method for making a variable-density preform according to an embodiment. FIG. 10 illustrates a spray-deposition method for making a variable-density preform according to an embodiment.

FIG. 11A is a perspective view of a working surface for making a variable-density preform according to an embodiment.

FIG. 11B is a perspective, cross-sectional view of the working surface in FIG. 11A according to an embodiment.

FIG. 12 is a perspective view of a press step for a method for making a variable-density preform according to an embodiment. This would be a hydraulic press, the preform would be put on the bottom platen and the top platen would move down and squeeze the preform to shape, squeezing some of the moisture out of the preform. This provides a very even gradient. The preform can be cut to shape after it has been pressed, in the case of a rotor.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A metal matrix composite article, comprising:
    a cast, reinforced body, the body comprising a first region and a second region, the first region having more reinforcement than the second region;
    a first reinforcement component;
    a second reinforcement component;
    a metal matrix composite material occupying the second region of the body and comprising a metal matrix material and the second reinforcement component;

a preform positioned in the first region of the body and infiltrated by at least the metal matrix material of the metal matrix composite material, the preform comprising
- a first end,
- a second end,
- an outer surface,
- the first reinforcement component, the first reinforcement component comprising a density increasing between the first end of the preform and the second end of the preform according to a first gradient, and
- a porous structure configured to allow passage of the metal matrix material into the preform and to block or reduce passage of the second reinforcement component into the preform; and a transition region extending between the first and second region of the body and located proximate the outer surface of the preform, the transition region comprising a distribution of the second reinforcement component adjacent to the outer surface of the preform, the distribution of the second reinforcement component comprising a density increasing according to a second gradient in a direction toward the outer surface of the preform.

2. The metal matrix composite article of claim 1, wherein the metal matrix material comprises a metal or a metal alloy and wherein the second reinforcement component comprises a ceramic particle component and/or a ceramic fiber component.

3. The metal matrix composite article of claim 2, wherein the metal matrix material comprises aluminum, magnesium, or an alloy thereof.

4. The metal matrix composite article of claim 1, wherein the first reinforcement component comprises a ceramic particle component and/or a ceramic fiber component.

5. The metal matrix composite article of claim 1, wherein the transition region comprises a thickness corresponding to an amount of the metal matrix material infiltrated into the preform.

6. The metal matrix composite article of claim 1, wherein the distribution of the second reinforcement component at the outer surface of the preform comprises a first volume fraction that matches a volume fraction of the first reinforcement component at the outer surface of the preform.

7. The metal matrix composite article of claim 6, wherein the metal matrix composite material comprises the second reinforcement component at a minimum volume fraction, and wherein the volume fraction of the distribution of the second reinforcement component decreases linearly or substantially linearly from the first volume fraction to the minimum volume fraction.

8. The metal matrix composite article of claim 1, wherein the article is a cast brake rotor.

9. The metal matrix composite article of claim 8, wherein the first region comprises a friction face and the second region comprises a hub.

10. The metal matrix composite article of claim 8, further comprising a second preform positioned in the first region of the body adjacent to the first preform, the second preform infiltrated by at least the metal matrix material of the metal matrix composite material.

* * * * *